(12) United States Patent
Jeong

(10) Patent No.: US 7,154,561 B2
(45) Date of Patent: Dec. 26, 2006

(54) SHARPNESS IMPROVEMENT APPARATUS FOR VIDEO SIGNALS

(75) Inventor: Sang Sik Jeong, Gunpo (KR)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 10/352,095

(22) Filed: Jan. 28, 2003

(65) Prior Publication Data

US 2003/0142225 A1    Jul. 31, 2003

(30) Foreign Application Priority Data

Jan. 31, 2002    (KR) .................. 10-2002-0005672

(51) Int. Cl.
*H04N 5/21* (2006.01)

(52) U.S. Cl. .................. 348/625; 345/589

(58) Field of Classification Search ........... 348/625, 348/606, 630, 675; 382/162–167, 266; 358/532; 345/589–605
See application file for complete search history.

(56) References Cited

U.S. PATENT DOCUMENTS

| | | | |
|---|---|---|---|
| 5,194,945 A * | 3/1993 | Kadowaki et al. .......... 358/520 |
| 5,598,184 A * | 1/1997 | Barkans ....................... 345/597 |
| 5,619,438 A * | 4/1997 | Farley et al. ................ 708/313 |
| 6,043,853 A * | 3/2000 | Shimazaki et al. .......... 348/625 |
| 6,233,022 B1 * | 5/2001 | Weston et al. ............... 348/625 |
| 6,278,492 B1 * | 8/2001 | Nakamura ................... 348/441 |
| 6,297,854 B1 * | 10/2001 | Suzuki et al. ................ 348/625 |
| 6,434,266 B1 * | 8/2002 | Kanno et al. ................ 382/162 |
| 6,633,410 B1 * | 10/2003 | Narushima ................... 358/1.9 |
| 6,819,359 B1 * | 11/2004 | Oda ............................ 348/247 |
| 6,834,124 B1 * | 12/2004 | Lin et al. ..................... 382/261 |
| 6,980,258 B1 * | 12/2005 | Matsunaga ................... 348/625 |
| 2003/0048385 A1 * | 3/2003 | Tomizawa et al. ........... 348/625 |

* cited by examiner

*Primary Examiner*—Victor R. Kostak
(74) *Attorney, Agent, or Firm*—Fleshner & Kim, LLP

(57) ABSTRACT

Disclosed is a sharpness improvement apparatus of an image signal which improves a sharpness of an analogue image signal so as to display a clear image. A display device which displays an inputted image signal on a screen can display a clear image with a digital sharpness improvement apparatus which realizes a sharpness of the image signal into a digital method by improving a degradation phenomenon of a signal generated at an analogue image processing into a simple digital circuit.

9 Claims, 6 Drawing Sheets

FIG. 1
CONVENTIONAL ART
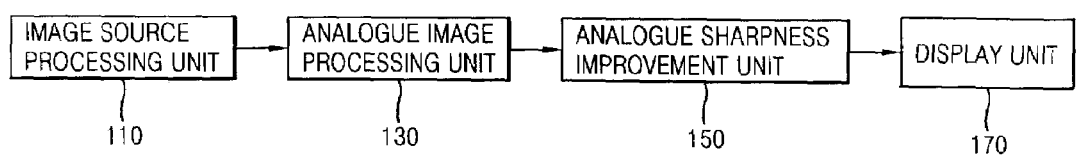
FIG. 2A
CONVENTIONAL ART
FIG. 2B
CONVENTIONAL ART
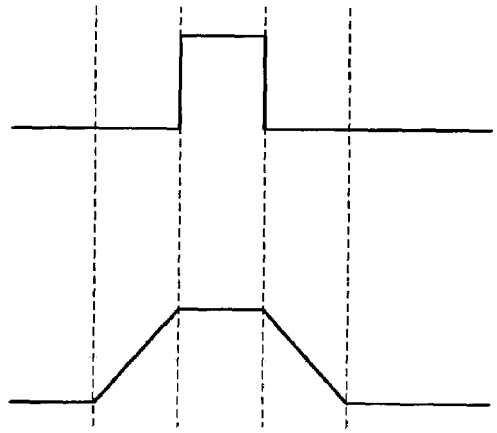

FIG. 5A
CONVENTIONAL ART
FIG. 5B
CONVENTIONAL ART
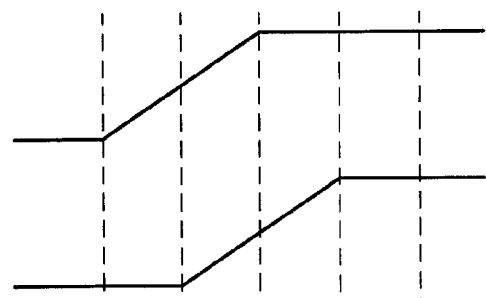
FIG. 5C
CONVENTIONAL ART
FIG. 5D
CONVENTIONAL ART
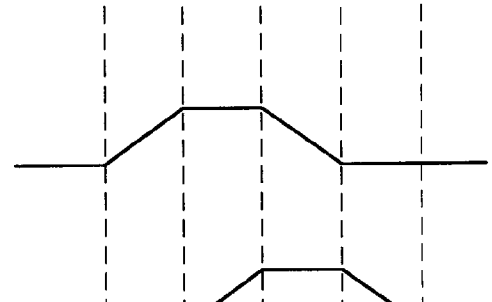
FIG. 5E
CONVENTIONAL ART
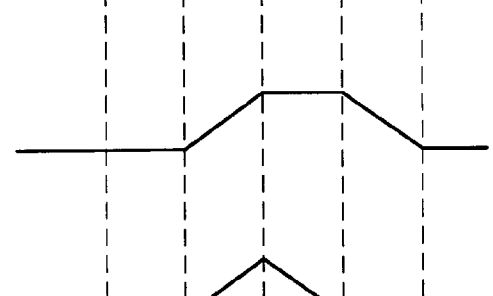
FIG. 5F
CONVENTIONAL ART
FIG. 5G
CONVENTIONAL ART
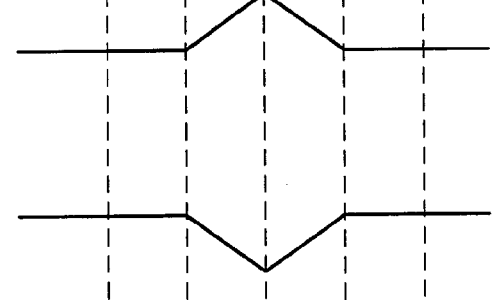
FIG. 5H
CONVENTIONAL ART
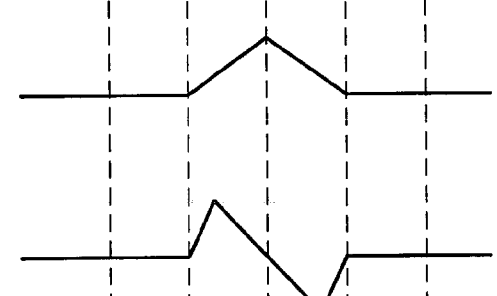
FIG. 5I
CONVENTIONAL ART
FIG. 5J
CONVENTIONAL ART
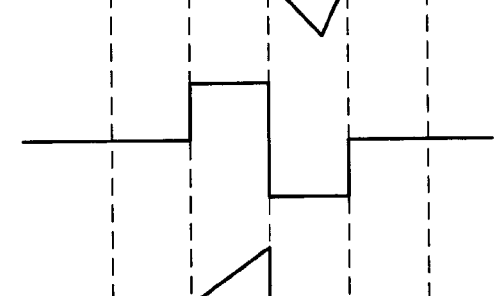

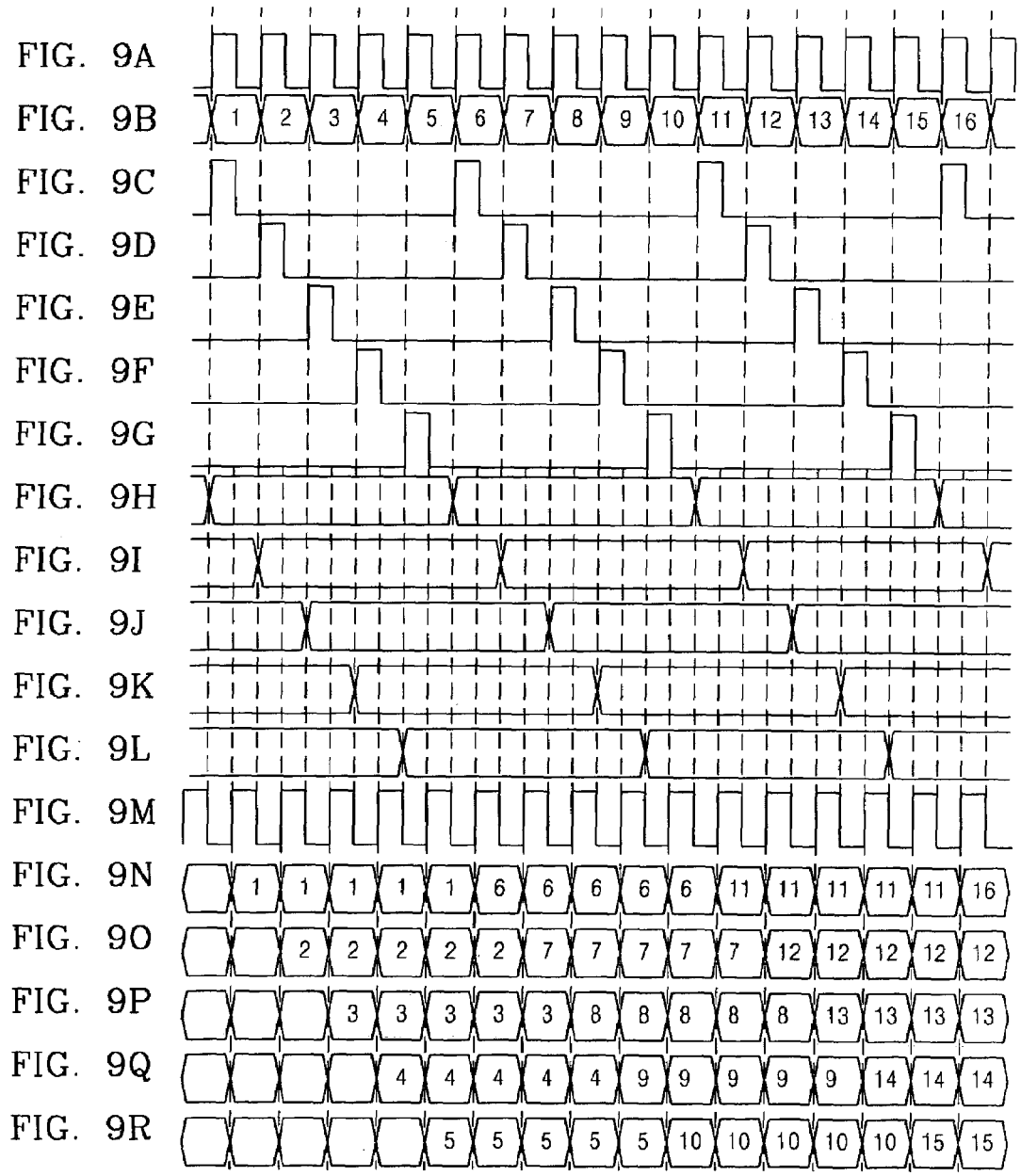

SHARPNESS IMPROVEMENT APPARATUS FOR VIDEO SIGNALS

BACKGROUND OF THE INVENTION

1. Field of the Invention

The present invention relates to a display device, and more particularly, to a sharpness improvement apparatus for analogue videos signals to display a clear image in a display device such as a television receiver and a monitor.

2. Description of the Background Art

Generally, a display device such as a television receiver and a monitor can not realize a clear image when an image signal of a received signal or an analogue image signal inputted from a computer system is processed into a predetermined analogue such as an amplification and a conversion because an edge characteristic of the image signal is deteriorated.

FIG. 1 is a block diagram showing a display device to which a sharpness improvement apparatus according to the conventional art is applied. The display device comprises an image source processing unit 110 for performing a predetermined image process by receiving an image signal; an analogue image processing unit 130 for outputting R, G, and B signals which can be displayed by receiving the signal processed in the image source processing unit; an analogue sharpness improvement unit 150 for improving a sharpness of the R, G, and B signals by receiving the R, G, and B signals; and a display unit 170 for receiving the R, G, and B signals having an improved sharpness and displaying them on a screen.

Operations of the display device will be explained as follows.

First, the image source processing unit 110 receives a predetermined image signal from an image media (not shown) connected to the outside or the inside or a storage media (not shown) and processes the image signal. Then, the analogue image processing unit 130 receives the signal-processed image signal, converts into the R, G, and B signals, and outputs. At this time, since the analogue image processing unit 130 is generally used by analogue devices, the R, G, and B signals are degraded than an original image source. Accordingly, the degraded R, G, and B signals have to be displayed on a screen of the display unit 170 by being improved in the analogue sharpness improve unit 150.

At this time, in case that a predetermined image signal is ideally processed in the analogue image processing unit 130, a gradient of one pixel signal is very sharp as shown in FIG. 2A. However, as shown in FIG. 2B, if the predetermined image signal is substantially processed in the analogue image processing unit 130, the gradient of the one pixel signal is very dilatory.

Accordingly, the image signal processed in the analogue image processing unit 130 is degraded and the gradient becomes dilatory. In case that the image signals are displayed in the display unit 170, as shown in FIG. 3, edges of left and right sides adjacent to a region where an image of the display unit is displayed are not clear compared with edges of the displayed screen.

Hereinafter, the analogue sharpness improvement apparatus 150 according to the conventional art will be explained.

FIG. 4 is a circuit diagram of the analogue sharpness improvement apparatus according to the conventional art. As shown, the sharpness improvement apparatus 150 comprises a first delay unit 151 for delaying the R, G, and B signals for a determined time by receiving them; a subtracter 152 for subtracting the delayed R, G, and B signals from the R, G, and B signals; a second delay unit 153 for delaying the delayed signal for a predetermined time; an AND operator 154 for AND operating the subtracted signal and the delayed signal from the second delay unit 153; an inverter 155 for inverting a signal outputted from the AND operator 154; a buffer 156 for synchronizing output time of the signals outputted from the AND operator 154 and the inverter 155; an amplifier 153 for amplifying the output signal of the AND operator 154 as a predetermined multiple; a differentiator 159 for differentiating the amplified signal; a Schmidt-trigger type buffer 160 for changing the differentiated signal into a square wave by a predetermined level; and a switching unit 157 for receiving a signal outputted from the Schmidt-trigger type buffer 160 and then selectively outputting.

The sharpness improvement apparatus according to the conventional art will be explained with reference to the attached FIGS. 5A to 5J.

First, as shown in FIG. 5A, when the predetermined R, G, and B signals are inputted to the first delay unit 151 and the subtracter 152, the first delay unit 151 outputs a signal delayed as a predetermined time as shown in FIG. 5B. Then, the subtracter 152 subtracts the delayed signal from the R, G, and B signals and then outputs as shown in FIG. 5C.

The second delay unit 153 delays the subtracted signal for a predetermined time as shown in FIG. 5D and then inputs to the AND operator 154. Then, the AND operator 154 logically multiplies a signal subtracted from the subtracter 152 with a signal delayed from the second delay unit 153 and then outputs as shown in FIG. 5E. At this time, the signal of FIG. 5E is equal to a result that first-inputted R, G, and B signals are first differentiated.

Subsequently, the inverter 155 receives a signal outputted form the AND operator, inverts like FIG. 5F, and inputs to the switching unit 157. Also, the buffer 156 receives a signal outputted from the AND operator 154, passes as it is like FIG. 5G, and inputs to the switching unit 157.

Also, the amplifier 158 receives a signal outputted form the AND operator 154, amplifies into a predetermined multiple, and inputs to the differentiator 159. Then, the differentiator 159 differentiates the amplified signal and outputs to the Schmidt-trigger type buffer 160 as shown in FIG. 5H. Also, the Schmidt-trigger type buffer 160 receives the differentiated signal, changes it into a square wave by a predetermined level, outputs as shown in FIG. 5I, and inputs to the switching unit 157.

The switching unit 157 performs a predetermined switching according to a signal outputted from the Schmidt-trigger type buffer 160. That is, if the output signal of the Schmidt-trigger type buffer 160 is a potential more than a predetermined reference, an output signal of the buffer 156 is selected to be outputted during the duration, and if the output signal is a potential less than a predetermined reference, an output signal of the inverter 155 is selected to be outputted during the duration. Accordingly, the output signal of the switching unit 157 outputs the first-inputted R, G, and B signals by a second differentiation, and represents as a waveform of FIG. 5J.

The second differentiated R, G, and B signals have gradient characteristics improved approximately two times than the inputted R, G, and B signals, thereby improving sharpness of the inputted R, G, and B signals.

However, the sharpness improving apparatus 150 according to the conventional art can improve the sharpness of the inputted R, G, and B signals by outputting the second differentiated signal like the FIG. 5J only when it is ideally realized. Also, since the sharpness improving apparatuses 150 are all composed of analogue devices, a wanted second differentiation signal can not be precisely obtained.

Besides, since the sharpness improving apparatus according to the conventional art performs the first and second differentiation of the inputted R, G, and B signals by using the analogue devices, overshooting and undershooting are generated. According to this, the inputted R, G, and B signals have a ringing phenomenon by the overshooting and the undershooting. Therefore, edges of an actual screen are seen as black.

In addition, even though the sharpness improvement can be done softly so as to reduce the ringing phenomenon, said method has a limitation to achieve the sharpness improvement of the inputted R, G, and B signals as wanted.

SUMMARY OF THE INVENTION

Therefore, an object of the present invention is to provide a digital sharpness improvement apparatus which can display a clear image by improving a degradation phenomenon of a signal generated at an analogue image processing into a simple digital circuit.

Another object of the present invention is to provide a digital sharpness improving apparatus which can improve a contrast of the display apparatuses by being applied to a high definition television (HDTV) receiver or a computer system monitor.

To achieve these and other advantages and in accordance with the purpose of the present invention, as embodied and broadly described herein, there is provided a sharpness improving apparatus of an image signal comprising: an image source processing unit for performing a predetermined image process by receiving an image signal; an analogue image processing unit for outputting R, G, and B signals which can be displayed by receiving the signal processed in the image source processing unit; a digital sharpness improvement unit for improving a sharpness of the R, G, and B signals by receiving the R, G, and B signals processed in the analogue image processing unit; and a display unit for receiving the R, G, and B signals having an improved sharpness and then displaying on a screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram showing a display device to which a sharpness improving apparatus according to the conventional art is applied;

FIG. 2A is a waveform showing a signal of one pixel before degradation in the analogue image processing unit;

FIG. 2B is a waveform showing a signal of one pixel after degradation in the analogue image processing unit;

FIGS. 5A to 5J are waveform for explaining operations of respective component parts of FIG. 1;

FIGS. 9A to 9R are waveforms for explaining operations of the respective component parts of FIG. 8.

DETAILED DESCRIPTION OF THE PREFERRED EMBODIMENTS

Figure 3:
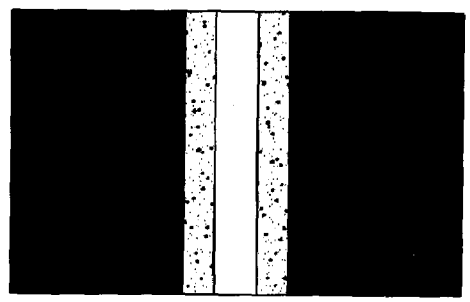
FIG. 3 is a view showing a state that a signal of one pixel is degraded according to the conventional art.
Figure 4:
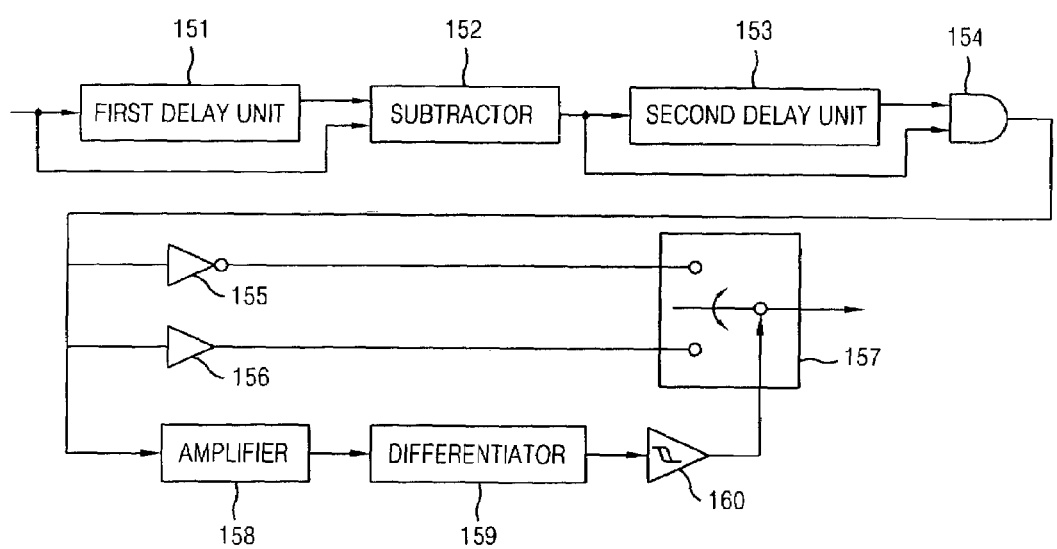
FIG. 4 is a circuit diagram of an analogue sharpness improving apparatus according to the conventional art.
Figure 6:
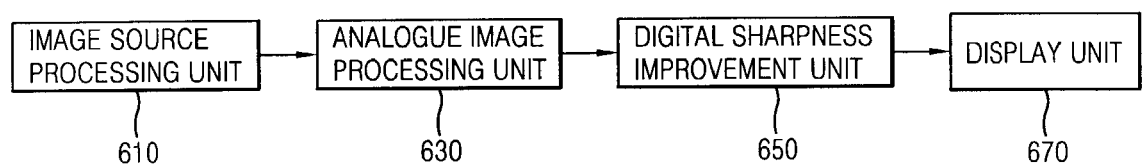
FIG. 6 is a block diagram showing a display device to which a digital sharpness improving apparatus according to the present invention is applied.

Reference will now be made in detail to the preferred embodiments of the present invention, examples of which are illustrated in the accompanying drawings. FIG. 6 is a block diagram showing a display device to which a digital sharpness improving apparatus is applied according to the present invention. The display device comprises: an image source processing unit 610 for performing a predetermined image process by receiving an image signal; an analogue image processing unit 630 for outputting R, G, and B signals which can be displayed by receiving the signal processed in the image source processing unit 610; a digital sharpness improvement unit 650 for improving a sharpness of the R, G, and B signals by receiving the R, G, and B signals processed in the analogue image processing unit 630; and a display unit 670 for receiving the R, G, and B signals having an improved sharpness and then displaying on a screen.

Operations of the display device will be explained.

First, the image source processing unit 610 receives a predetermined image signal from an image media (not shown) connected to the outside or the inside or a storage media (not shown) and processes the image signal. Then, the analogue image processing unit 630 receives the signal-processed image signal, converts into the R, G, and B signals, and outputs.

Figure 7:
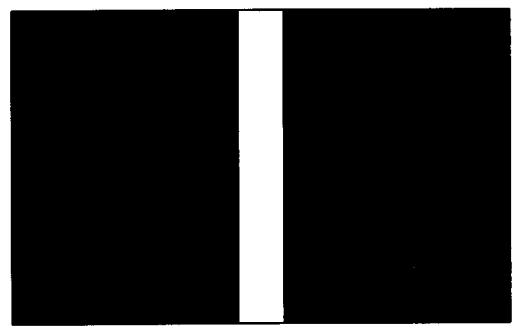
FIG. 7 is a view showing a state of one pixel improved by the digital sharpness improving apparatus according to the present invention.

The digital sharpness improving unit 650 receives the R, G, and B signals, improves a sharpness of the R, G, and B signals, and outputs to the display unit. Then, the display unit displays the R, G, and B signals having an improved sharpness. Accordingly, as shown in FIG. 7, an image outputted from the display unit 670 has clear edges of regions corresponding to right and left sides of a region which is displayed on the display unit 670.

Figure 8:
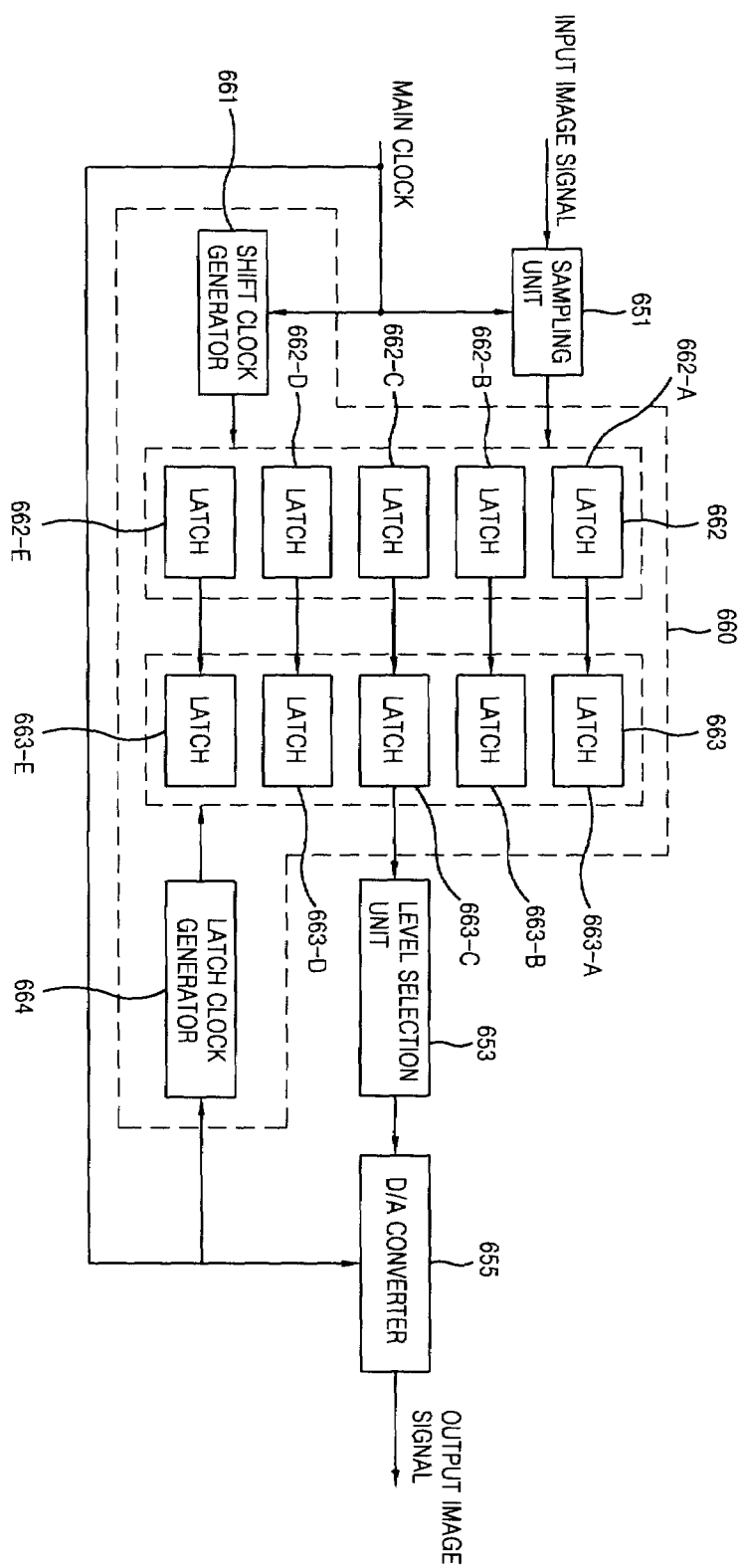
FIG. 8 is a detail view showing the digital sharpness improving unit of FIG. 6.

FIG. 8 is a detail view showing the digital sharpness improving unit of FIG. 6. As shown, the digital sharpness improving unit 650 includes a sampling unit 651 for receiving the R, G, and B signals and sampling according to a predetermined clock signal (MC); a parallel converter 660 for storing the sampled signals into respective data, moving, and thereby converting into a plurality of parallel data; a level selection unit 653 for receiving the parallel-converted data, determining each level of the data, and thereby selecting a data having the highest level; and a digital/analogue converter 655 for converting an output signal of the level selection unit 653 into the R, G, and B signals of an analogue.

Also, the parallel converter 660 includes a shift clock generator 661 for receiving a main clock signal and thereby generating a clock signal which shifts a plurality of latches; a latch clock generator 664 for generating a latch clock signal which controls operations of the latches by the main clock signal; a first latch unit 662 composed of a plurality of latches 662-A, 662-B, . . . , 662-E for circulating the plurality of latches 662-A, 662-B, . . . 662-E by the shift clock signal and circulating/storing the sampled signal outputted from the sampling unit 651; and a second latch unit 663 composed of a plurality of latches 663-A, 663-B, . . . 663-E for simultaneously storing and outputting the plurality of data outputted from the first latch unit 662.

Operations of the sharpness improving apparatus according to the present invention will be explained.

First, as shown in FIG. 9A, the sampling unit 651 samples the R, G, and B signals according to a predetermined main clock signal (MC) when the R, G, and B signals are inputted to the sampling unit 651. The shift clock generator 661, as shown in FIGS. 9C to 9G, generates clocks at the respective latches 662-A, 662-B, . . . , 662-E included in the first latch unit 662, in which the clocks are obtained by dividing a period of the main clock signal by the number of latches. That is, the number of the latches is five, the shift clock generator 661 generates the shift clock signal applied to the latches as 1/5 of the respective clock signals and applies it to the respective latches 662-A, 662-B, . . . , 662-E.

Then, the latches 662-A, 662-B, . . . , 662-E, as shown in FIGS. 8H to 8I, sequentially store and output the output signal of the sampling unit 651. That is, the latch 662-A sequentially stores and outputs 1th, 6th, 11th, 16th, . . . , signals outputted from the sampling unit, the latch 662-B sequentially stores and outputs 2th, 7th, 12th, 17th, . . . , signals, the latch 662-C sequentially stores and outputs 3th, 8th, 13th, 18th, . . . , signals, the latch 662-D sequentially stores and outputs 4th, 9th, 14th, 19th, . . . , signals, and the latch 662-E sequentially stores and outputs 5th, 10th, 15th, 20th, . . . , signals.

On the other hand, the latch clock generator 664 generates a clock signal having the same period with the main clock signal (MC). Then, since the latch clock signal 664 is respectively applied to the latches 663-A, 663-B, . . . , 663-E of the second latch unit 663, as shown in FIGS. 8N to 8R, the latches 663-A, 663-B, . . . , 663-E respectively store and output data applied from the first latch unit 662. That is, the parallel output unit 660 stores a sampled signal from the sampling unit 651, and applies it to the level selection unit 653 sequentially by a following order, 1 to 5th signals inputted from the sampling unit 651, 2 to 6th signals, 3 to 7th signal, and 4 to 8th signals.

Subsequently, the level selection unit 653 compares levels of the signals inputted from the parallel output unit 660, selects one signal having the highest level, and outputs it to the digital/analogue converter 655. That is, the level selection unit 653 outputs the selected plurality of bit signals to the digital/analogue converter 655. At this time, the selected plurality of signals are a signal having the highest level among the 1 to 5th plurality of bit signals, a signal having the highest level among the 2 to 6th plurality of bit signals, a signal having the highest level among the 3 to 7th plurality of bit signals, and a signal having the highest level among the 4 to 8th plurality of bit signals. Then, the digital/analogue converter 655 receives the bit signals, converts them to analogue signals, and outputs original image signals R, G, and B signals. At this time, the R, G, and B signals have an improved sharpness.

Accordingly, when a signal which passes through the sharpness improving apparatus 650 is directly inputted to the display unit 670, a clear image having an improved sharpness can be displayed.

On the other hand, in case that the display device displays by using a digital signal, signals selected from the level selection unit 653 can be directly displayed to the display unit 670 without passing the digital/analogue converter 655.

As aforementioned, the sharpness improving apparatus according to the present invention can display a clear image by improving a degradation phenomenon of a signal generated at the analogue image processing into a simple digital circuit.

Also, the sharpness improving apparatus according to the present invention can improve a contrast of the display apparatuses by being applied to a high definition television (HDTV) receiver or a computer system monitor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A sharpness improvement apparatus of an image signal comprising:
   an image source processing unit for performing a predetermined image process by receiving an image signal;
   an analogue image processing unit for outputting R, G, and B signals which can be displayed by receiving the signal processed in the image source processing unit;
   a digital sharpness improvement unit for outputting an improved sharpness of an image signal having a highest level selected from a certain number of successive input digital signals converted from the R, G, and B signals processed by the analogue image processing unit; and
   a display unit for receiving the R, G, and B signals having an improved sharpness and then displaying on a screen, wherein the digital sharpness improvement unit includes:
      a sampling unit for receiving the R, G, and B signals and sampling according to a predetermined clock signal (MC);
      a parallel converter for storing the sampled signals into successively located respective data and thereby converting into a plurality of parallel data;
      a level selection unit for receiving the parallel-converted data, determining each level of the data, and thereby selecting a data having the highest level; and
      a digital/analogue converter for converting an output signal of the level selection unit into the R, G, and B signals of an analogue.

2. The apparatus of claim 1, wherein the parallel converter includes:
   shift clock generator for receiving a main clock signal and thereby generating a clock signal which shifts latching timing within a plurality of latches;
   a latch clock generator for generating a latch clock signal which controls operations of a second plurality of latches according to the main clock signal;
   a first latch unit composed of the plurality of latches for successively storing sampled signals outputted from the sampling unit by the shift clock signals; and
   a second latch unit composed of the second plurality of latches for simultaneously storing and outputting the plurality of data outputted from the first latch unit.

3. The apparatus of claim 2, wherein the shift clock generator generates clocks at the respective latches included in the first latch unit by dividing a frequency of the main clock signal by the number of the respective latches.

4. The apparatus of claim 2, wherein the latch clock generator generates a clock signal having the same period with the main clock signal.

5. A sharpness improvement apparatus of an image signal including a digital sharpness improvement unit for improving a sharpness of an image signal into a digital method by selecting a signal having a highest level from a certain number of successive image signals stored according to time in a display device which receives an image signal and displays on a screen, wherein the digital sharpness improvement unit includes:

a sampling unit for receiving the image signals and sampling according to a predetermined clock signal;

a parallel converter for storing the sampled signals into respectively successive data, and thereby converting into a plurality of parallel data;

a level selection unit for receiving the parallel-converted data, determining each level of the data, and thereby selecting a data having the highest level; and a digital/analogue converter for converting an output signal of the level selection unit into analogue image signals.

6. The apparatus of claim 5, wherein the parallel converter includes:

a shift clock generator for receiving a main clock signal and thereby generating a clock signal which shifts latching dining within a plurality of latches;

a latch clock generator for generating a latch clock signal which controls operations of a second plurality of latches by the main clock signal;

a first latch unit composed of the plurality of latches for successively storing sampled signals outputted from the sampling unit by the shift clock signals; and a second latch unit composed of the second plurality of latches for simultaneously storing and outputting the plurality of data outputted from the first latch unit.

7. The apparatus of claim 6, wherein the shift clock generator generates clocks at the respective latches included in the first latch unit by dividing a frequency of the main clock signal by the number of the respective latches.

8. The apparatus of claim 6, wherein the latch clock generator generates a clock signal having the same period with the main clock signal.

9. The apparatus of claim 6, wherein the plurality of latches store consecutive successively sampled signals outputted by the sampling unit.

* * * * *